United States Patent Office 3,098,766
Patented July 23, 1963

3,098,766
PROCESS FOR CLARIFYING SUGAR JUICES BY ADDITION OF A BUFFER
Peel René Payet, Combuston, France
No Drawing. Filed May 3, 1960, Ser. No. 26,406
Claims priority, application France July 20, 1959
3 Claims. (Cl. 127—50)

The present invention applies to all natural liquids, blood, saps, fruit juices, sugar-cane, beet-sugar and even worts, to sugar refinery clarifiers, liquors and syrups, so long as they solubilize elements which contribute towards life, such as sugars, wines, beers, milk, etc.

It is based on the fact that these liquids possess a natural pH and defense systems for maintaining this pH and preventing any flocculation.

The search for flocculation of these liquids presumes the existence of an isoelectric point in these liquids; but the number and diversity of their constituents prevents them from possessing this definite isoelectric point.

The treatment of these natural juices for securing their purification by various chemical products is known.

One of the means of this purification is to flocculate colloids. For this, different pH must be reached from those that the juices possess in their natural medium.

Now, it is also known that natural juices contain numerous buffer and amphoteric substances. Among the former, we may refer more particularly to acids and their salts; among the latter, polypeptides, amino-acids, sucrose itself.

The part played by these substances in the natural juice is not an accidental one; they help to give to the juice and extractive materials that it contains, their natural stability, corresponding to life. If we kill the cell, these substances will no longer play their part, they will continue to live, in a way, and to react on their own initiative.

It is certain that when we add a chemical product such as lime to a natural juice in order to alter the pH, we also impair the amphoteric and buffer substances of this juice.

Starting, for instance, from a sugar cane juice, whose natural pH is about 5.5 and adding a limewash to it in order to raise the pH to a value equal to 8 (phenolphthaline red), this has a strong action on the buffer substances because we are obliged to destroy their function to reach the pH of 8.

Likewise, by creating an alkaline medium, we modify the structure of the amphoteric substances which react like acids.

We will admit that the juice has an isoelectric point. To reach the isoelectric point and flocculate, it is obvious that the resistance of the juice will call for the utilizing of quantities of acids or bases exceeding the desired action.

However:
(1) The juice loses its organoleptic properties;
(2) Its chemical composition changes (CaO salts in cane sugar refining);
(3) The juice loses its capacity to resist the chemical disintegration of its constituents: degradation of sugars, of polypeptides.

The whole corresponds to an increase of molassigenic matter. With regard to the CaO salts, they precipitate against decantation, spoiling the already purified juices, incrusting the evaporation surfaces, preventing normal syrup concentration by causing false grains.

The purpose of the present invention is to depart from the former process and no longer substantially raise the pH value for flocculation, thus to remain nearer to the natural pH of the juice and retain the defenses, salts and acids that the matter may contain. One could not act otherwise if the purpose in view were to retain the organoleptic characteristics of cane and beet juices, in order to deliver them for human consumption, which is one of the objects of the present invention.

For this purpose, the present invention relates in a general manner, to a process for extracting and purifying natural or biological juices, characterized in that throughout the extraction and purifying process, a uniform pH is maintained which is as near as possible to the pH of the natural medium.

The invention also relates to the following characteristics and their various possible combinations.

As, in order to clarify the juice, external means must be applied which may be detrimental to the juice, the natural defenses of the juice are strengthened by all means that can co-operate, more particularly by adding a buffer system, harmonized with the pH to be retained and an endeavor would be made throughout the superadded clarification process to remain as close as possible to the natural pH. Its own defense, like those added would help in and watch over this.

The invention also relates to another process characterized in that there is added to the juice, before any treatment, a buffer system harmonized with the natural pH of the juice, which reinforces the natural defense of the latter.

Suitable physical treatment can then be applied, such as the action of heat, for purifying the juice.

For sugar-cane juice (pH 5.5), sugar beet juice (pH 6.5), refinery clarifiers, a mixture of mono and bi-metallic phosphoric salts is the most suitable. This is effected, before any intervention, by introducing requisite quantities of a mixture chosen at will, into the juice:

(1) Tribasic phosphate of soda with $H_3PO_4$ added;
(2) $NaOH+H_3PO_4$;
(3) $Na_2CO_3+H_3PO_4$.

The quantity is the minimum that will ensure the juice content.

Only after that comes clarification by means left to the manufacturer's discretion, but which must be such that the pH does not vary.

It is known that sugar refinery juices contain condensed bodies, for instance:

(1) Sucrose which is the product sought by the manufacturer and about which care must be taken so as not to damage it;
(2) Starch and cellulose which, on the other hand, are harmful but less so than their degradation products;
(3) Polypeptides which are especially harmful in paralyzing the running of the factory but are less harmful than their degradation products; their pH is about 3;
(4) Waxes and pectic matter which are also liable to become degraded.

As, in a general rule, the slightly important molecules, resulting from the degradation of heavy molecules, have a tendency to form colloidal bodies which are more difficult to eliminate than the original heavy molecules, in all industrial manufacturing, there should be an endeavor to avoid any degradation process.

Now, what does the manufacturer do during the known purifying processes?

The first operation consists of liming, and to such an extent that cane sugar pH 8 is easily exceeded. A brutal action of this kind will assuredly have the following consequences:

(a) The alkaline medium favorizes the oxidation of glucoses into acids, which, on their side, react on the sucrose with the formation of glucoses by inversion, etc. There is thus a loss of crystallizable sugar;

(b) The starch and cellulose which are harmless colloids, which decant easily, enter into colloidal solution and will no longer decant;

(c) The polypeptides break up into amino-acids and for one acid extremity thousands now arise out of it.

The multiplied and lighter micells become more difficult to catch and decant.

A proof of the reactions described above is the fact that the pH of the juice falls rapidly during the decantation following the addition of lime. The juice emerges from decantation at a pH 7–6.5 or even 5.5 for the older juices, by thus returning to the natural pH. The addition of lime has thus not attained its object.

The spontaneous reduction of the pH is a proof:
(1) That the natural defenses of the juice exist;
(2) That they have not all been destroyed by the lime;
(3) That they react to the lime;
(4) That they will return to the natural pH if given enough time.

The lime addition thus appears to be superfluous.

If liming was the only process used by manufacturers, the explanation is, that before the present invention, no other means existed for clarifying the juices and continuing the operations.

Of course, a large part of this lime is eliminated in the scums causing the indispensable minimum of clarification, but there are drawbacks which exceed this advantage:

Part of the lime salts will not precipitate during decantation, but only subsequently by forming deposits on the surfaces of the appliances;

The lime causes a certain number of substances to enter into the true or colloidal solution. The actual extent of the clarity of the filtered juice does not form a sign of the effectiveness of the clarification, for colloidal solutions may have a clear appearance.

Even the sugar can provided colloids by caramelization due to the alkaline medium.

The polypeptides, organic matters, waxes and pectines become degraded under the influence of lime while providing numerous and lighter colloids, which thus escape clarification, and whose harmful effect on crystallization will be according to their fineness (false grains).

The glucoses, by oxidizing, form acids.

The addition of lime to refinery clarifiers has the purpose of guaranteeing the juice against eventual inversion, but the chances of success are small, because both in sugar refining as well as in refinery practice, and as already explained above, the pH lowers in spite of, and even because of, the lime which favorizes the oxidation of glucoses with the formation of acid products.

It is also known that raw juices keep better than filtered ones; this means that the acids and natural defenses of the juice are necessary for its preservation, including that of sucrose.

But in order to do away with lime of which we have explained all it disadvantages, it becomes necessary to find another clarifying process. Heat and the coagulation of albuminoids are insufficient means. This coagulation must be helped, by a precipitate caused on the spot which does not introduce CaO into the juice, and which abides by the natural pH throughout the purifying process.

Among the precipitates available for the manufacturer, the most convenient is bicalcic phosphate. It is a product that the refinery uses incidentally as reagent for causing "in situ" a precipitate of tricalcic phosphate with a view to perfecting conventional filtering.

This now refers to obtaining it as a manufacturing by-product, the reagent becoming phosphoric acid.

It is here that the buffer added according to the process of the invention comes into action: the best buffer is the mono and bi-metallic mixture of phosphate, without the invention being obviously restricted to this particular buffer or sole mode of protection.

Before starting to operate, the buffer is added to the juice. It is the buffer which enables it to precipitate all the lime, to maintain the pH, to afford the manufacturer an entire range of acid pH of which he can take advantage according to the quality of the raw material treated, the tonnage to be through-put, his equipment, and the consumer's or refiner's requirements.

The metallic ion utilized corresponds to about 50 g. of sodium carbonate $Na_2CO_3$ per ton of sugar cane.

Naturally, and although sodium salts are the preferred salts, the sodium can be replaced by any cation which gives a phosphate soluble in water.

The quantity of buffering product to be added must be decided for each case, for it depends upon the quality of the matter to be treated (year, harvest, etc.), its purity, its original acidity, etc. It is reduced to the minimum compatible with the result sought.

According to the former processes, the manufacturer added lime for reaching a given pH, different from the natural pH; according to the process of this invention, the manufacturer adds the soda for maintaining the pH as uniform as possible.

According to the former processes, the lime precipitated; according to the processes of this invention, the soda dissolves.

Unlike earlier processes the present invention adds soluble chemical bodies to the juice and maintains the natural pH but thereby obtains a larger relative amount of sugar and increased purity.

The invention also relates to a form of embodiment of the afore-going process, characterized in that the addition of a chemical product, if required for purifying a juice and if it tends to alter the natural pH of the treated juice, is immediately compensated by the addition of another chemical product whose object is to maintain the pH at its original value.

According to one form of embodiment of the invention, lime and phosphoric acid are simultaneously added to the juice to be treated, so as to maintain the pH at a value as near as possible to the natural value. Dicalcic phosphate thus forms "in situ" of the juice. The amphoteric, mineral or organic substances are not touched, no residue of foreign matters or soluble lime salts forms in the juice, and the dicalcic phosphate acts solely by its absorbing properties. The clarification effect is nevertheless reached, but in conditions which have regard to the vital character of the juice.

In these conditions, the buffer substances are also not touched.

When the purification is obtained in the conditions described above, i.e., by operating with a uniform pH and as near as possible to the pH of natural juice, the sequence of the operations, and more particularly the concentration and isolating of the extractive matter, the sugar, for instance, can be continued by conventional methods.

*Example*

The juice obtained from a ton of sugar cane receives an addition of 50 g. neutral carbonate of sodium and the quantity of phosphoric acid required for preventing any variation of the pH.

Purification then consists of introducing 450 g. of lime and the corresponding phosphoric acid concurrently in order to produce "in situ" a precipitate of bicalcic phosphate.

Then heat is applied for coagulating the albuminoid matters.

The advantages obtained have been the following:
(1) Reduction in the total quantity of bases utilized 500 g. (450 lime+$50Na_2CO_3$) as compared with 1000 g. of lime;
(2) Considerable increase in the factory production. Decantation capacity doubled;
(3) Invariable pH during decantation and farther on;
(4) Deposits disappear, the factory can be continuously operated;
(5) Speedy, easy and dry concentrated syrups;

(6) Molasses of less weight and not so rich;
(7) Reduction in the volume of scums and their quantity;
(8) Reduction in the volume of filtrates;
(9) The glucoses are respected;
(10) The sucrose yield is improved owing to the higher speed of the process and the glucoses being respected;
(11) The sugars filter better during refining;
(12) The molasses are easier to work;
(13) The rum has a better flavor;
(14) The yield increases owing to the glucoses remaining unchanged;
(15) The quantity of phosphates added to the wort can be reduced;
(16) If ammonia is utilized, that added to the worts is economized.

In sugar beet processing, the process of the invention is still easier to apply on account of the higher pH of the beet juice: pH=6.5. Moreover, sugar beet juice naturally contains soluble salt bases required as buffers.

The process according to the invention arrives at a simplicity, economy of means, mastery of its factors, such as are required in sugar beet processing. Here, it consists, after controlling the bases required for the buffer to produce the precipitate of lime phosphates, to heat, continuously decant, continuously filter the scums and go on to evaporation.

In sugar refinery practice, the process affords the same advantages both for cane or beet sugar refining. More than the raw sugar manufacturer, the refiner needs lubricating matters to be able to handle his concentrated syrups. The best lubricant is glucose.

We thus see the great interest that arises out of the processes of the invention, which, precisely, enables the glucoses to remain, without degrading the sucrose which is the final product sought for.

Another field, where the processes of the invention contribute a tasteful and beneficial solution, is the employing of ion exchangers.

Ion exchangers can only be efficacious on previously clarified juices. They concord better with the process according to the invention which removes the colloids without making more harmful ones at less expense.

It is quite obvious that the invention is not restricted to the examples described above, from which other alternatives can be provided without going outside of the scope of the invention.

The invention has been described more particularly in connection with sugar refinery juices but it is understood that the invention will afford the same advantageous results with all natural or biological liquids.

What I claim is:
1. In a process for clarifying sugar juices extracted from a sugar producing plant, said sugar juice having a natural pH level of approximately 5.5 to 7, the step of introducing a buffer system into the sugar juice, said buffer system acting to maintain the pH level of the sugar juice at said natural value throughout said clarification procedure.

2. A process in accordance with claim 1 wherein said buffer system comprises a mixture selected from the group consisting of tribasic phosphate of soda with $H_3PO_4$; NaOH with $H_3PO_4$; and $Na_2CO_3$ with $H_3PO_4$.

3. A process in accordance with claim 1 wherein said sugar juice is heated in the presence of lime and phosphoric acid subsequent to the addition of said buffer system for coagulating albuminoid matter.

References Cited in the file of this patent
UNITED STATES PATENTS

| 1,067,890 | Woegerer | July 22, 1913 |
| 2,776,229 | Peterson | Jan. 1, 1957 |
| 2,977,253 | Grandadam | Mar. 28, 1961 |

OTHER REFERENCES

Cane Sugar Handbook, Spencer et al., 8th ed., pp. 80–83, 296–297, 306–308, John Wiley and Sons, Inc., New York, 1945. (Copy in Division 43.)